No. 707,189. Patented Aug. 19, 1902.
J. WATTS.
FIFTH WHEEL.
(Application filed Mar. 29, 1902.)
(No Model.)
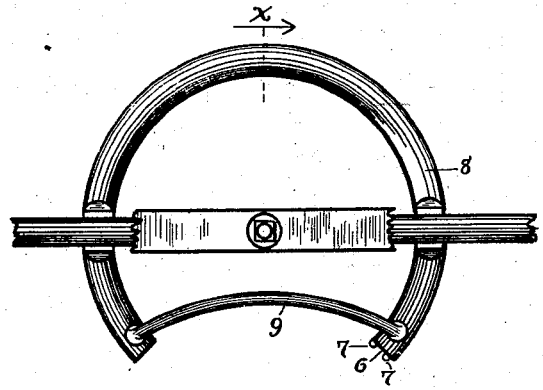
Fig. 1.
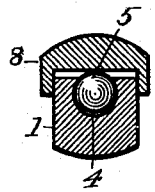
Fig. 2.
Fig. 3.
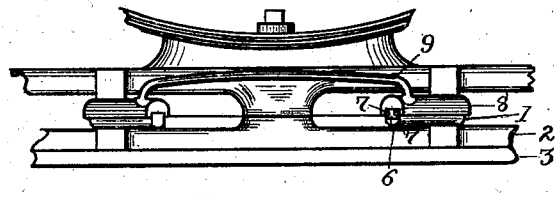
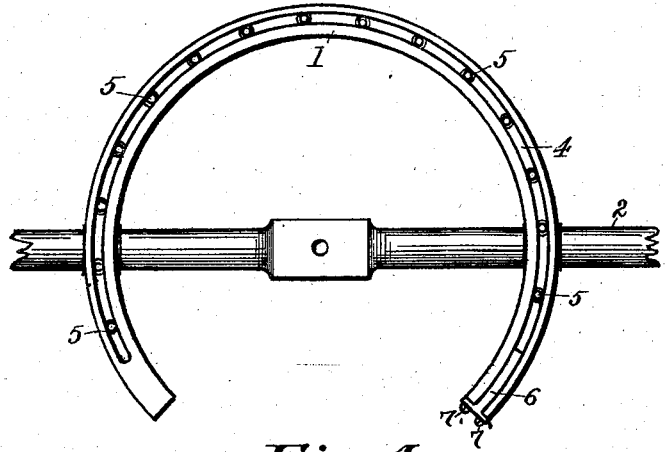
Fig. 4.
Witnesses:
Walter Bowman
Maude Gwisler
Inventor:
John Watts,
By Humphrey & Humphrey,
Attorneys.

UNITED STATES PATENT OFFICE.

JOHN WATTS, OF AKRON, OHIO.

FIFTH-WHEEL.

SPECIFICATION forming part of Letters Patent No. 707,189, dated August 19, 1902.

Application filed March 29, 1902. Serial No. 100,508. (No model.)

*To all whom it may concern:*

Be it known that I, JOHN WATTS, a citizen of the United States, residing at Akron, in the county of Summit and State of Ohio, have invented a certain new and useful Improvement in Fifth-Wheels, of which the following is a specification.

My invention has relation to improvements in ball-bearing fifth-wheels for carriages, buggies, and other road-vehicles.

The objects of my invention are to adapt the ball-bearing to a three-quarters fifth-wheel as well as to a complete circle, to prevent dirt from the outside entering the ball-channel when the front axle is turned, and to retain the balls against escaping from the groove in the lower half when the upper half is separated from it either purposely or by accident.

To the accomplishment of the aforesaid objects my invention consists in the peculiar and novel construction, arrangement, and combination of parts hereinafter described and then specifically pointed out in the claims, reference being had to the accompanying drawings, which form a part of this specification.

In the accompanying drawings, in which similar reference-numerals indicate like parts in the different figures, Figure 1 is a plan of my invention with the ends of the bolster and spring broken away; Fig. 2, a section of the same enlarged at the line $x$ of Fig. 1; Fig. 3, a front elevation of the same, and Fig. 4 a plan of the lower half and axle with ends broken away.

Referring to the figures, 1 is the lower half of the fifth-wheel, resting on and secured to the wooden part 2 and metal part 3 of the axle. In the upper face of the lower half 1 is a channel 4, that is more than semicircular in section, preferably three-quarters of a circle, or nearly that, but exceeding a semicircle, so that the opening is less in width than the greater diameter of the channel. This channel extends at the right end of the lower half to that end to afford a place for inserting the balls, but does not extend to the other end, but terminates before reaching it, thus leaving integral metal to arrest the escape of the balls at that end. The balls 5 are made of proper size to fit the channel 4, but are too large to escape through its open top and are inserted at the right end of the lower half, which end is then closed with a metallic T-shaped plug 6, held by screws 7. The upper half 8 has side flanges that fit and overhang the sides of the lower half 1, and the front ends are strengthened by the usual cross-brace 9. By this arrangement and construction the balls fulfil their purpose of preventing friction between the upper and lower halves of the fifth-wheel and when once inserted and the plug 6 secured cannot escape when for any purpose or by any means the upper half is removed or lifted, while as the channel 4 stops short of the ends of the lower half at each end dirt cannot enter it in turning the vehicle.

Having thus described my invention, what I claim, and desire to secure by Letters Patent, is—

1. An improved fifth-wheel less than a circle, the lower half of which has a round ball-channel open at the top less in width than the greatest diameter of the channel, one end of said channel being closed by an integral stop, and the other by a detachable plug, substantially as shown and described.

2. An improved fifth-wheel, less than a circle, the lower half of which has a round ball-channel open at the top, the top opening being less in width than the greatest diameter of the channel, said channels being closed at one end with a detachable plug, with balls fitted to run in said lower half and project above its top, and an upper half concentric with the lower, having a flat under face to ride on said balls, and having flanges to overhang the edges of the lower half, substantially as shown and described.

In testimony that I claim the above I hereunto set my hand in the presence of two subscribing witnesses.

JOHN WATTS.

In presence of—
C. E. HUMPHREY,
MAUDE ZWISLER.